(12) United States Patent
Hsu

(10) Patent No.: US 11,019,710 B1
(45) Date of Patent: May 25, 2021

(54) GROUND INSERT LAMP WITH SMART CONTROL SYSTEM

(71) Applicant: Dong Guan Jia Sheng Lighting Technology Co., Ltd. China, Dong-Guna (CN)

(72) Inventor: Kevin Hsu, Taichung (TW)

(73) Assignee: Dong Guan Jia Sheng Lighting Technology Co., Ltd. China, Guang-Dong (CN)

( * ) Notice: Subject to any disclaimer, the term of this patent is extended or adjusted under 35 U.S.C. 154(b) by 0 days.

(21) Appl. No.: 16/882,835

(22) Filed: May 26, 2020

(51) Int. Cl.
| | |
|---|---|
| *H05B 45/10* | (2020.01) |
| *H05B 47/19* | (2020.01) |
| *F21V 21/08* | (2006.01) |
| *H05B 45/3725* | (2020.01) |
| *H05B 45/20* | (2020.01) |
| *F21V 21/30* | (2006.01) |
| *F21Y 115/10* | (2016.01) |

(52) U.S. Cl.
CPC ......... *H05B 47/19* (2020.01); *F21V 21/0824* (2013.01); *H05B 45/10* (2020.01); *H05B 45/20* (2020.01); *H05B 45/3725* (2020.01); *F21V 21/30* (2013.01); *F21Y 2115/10* (2016.08)

(58) Field of Classification Search
CPC ........ H05B 45/10; H05B 45/20; H05B 47/11; H05B 47/19; H05B 47/105; H05B 45/3725; F21S 13/02; F21S 8/081; F21S 9/02; F21V 21/0824; F21V 23/06; F21V 21/30; F21Y 2115/10
See application file for complete search history.

(56) References Cited

U.S. PATENT DOCUMENTS

| | | | |
|---|---|---|---|
| 9,644,828 B1 * | 5/2017 | May | H05B 47/19 |
| 10,738,992 B1 * | 8/2020 | Hsu | F21S 8/061 |
| 10,823,395 B1 * | 11/2020 | Hsu | F21S 8/033 |

* cited by examiner

*Primary Examiner* — Haissa Philogene
(74) *Attorney, Agent, or Firm* — Alan D. Kamrath; Karin L. Williams; Mayer & Williams PC

(57) ABSTRACT

A ground insert lamp includes a smart control module, a main machine module, and multiple ground insert lamp modules. The smart control module is connected to the main machine module. The main machine module includes a ground insert lamp transformer, a first connecting module, and a second connecting module. The first connecting module is connected to the smart control module. The second connecting module is connected to the ground insert lamp modules. Each of the ground insert lamp modules includes a third connecting module, an LED electric driving source, and a ground insert lamp body. The third connecting module is connected with the second connecting module. The ground insert lamp body is connected with the LED electric driving source and has light emitting members. Each of the ground insert lamp modules controls the LED electric driving source to regulate brightness and color temperature.

3 Claims, 3 Drawing Sheets

GROUND INSERT LAMP WITH SMART CONTROL SYSTEM

BACKGROUND OF THE INVENTION

1. Field of the Invention

The present invention relates to an illuminating apparatus and, more particularly, to a ground insert lamp.

2. Description of the Related Art

A conventional ground insert lamp comprises a ground insert and a lamp body mounted on the ground insert. Thus, the ground insert is inserted into the soil to attach the lamp body to the ground. The conventional ground insert lamp is mounted outdoors to provide an illuminating function. However, the brightness of the conventional ground insert lamp is regulated manually and cannot be controlled automatically, thereby causing inconvenience in operation and control.

BRIEF SUMMARY OF THE INVENTION

The primary objective of the present invention is to provide a ground insert lamp with a smart (or an intelligent) control system.

In accordance with the present invention, there is provided a ground insert lamp comprising a smart control module, a main machine module, and a plurality of ground insert lamp modules. The smart control module cooperates with the main machine module. The smart control module is signal connected to the main machine module. The main machine module includes a ground insert lamp transformer, a first connecting module, and a second connecting module. The first connecting module is signal connected to the smart control module. The second connecting module is signal connected to the ground insert lamp modules. Each of the ground insert lamp modules includes a third connecting module, an LED electric driving source, and a ground insert lamp body. The third connecting module cooperates with the second connecting module and is connected with the second connecting module. The ground insert lamp body is connected with the LED electric driving source. The ground insert lamp body has an interior provided with a plurality of light emitting members with multiple color temperatures. Each of the ground insert lamp modules controls the LED electric driving source to regulate brightness and color temperature of the light emitting members of the ground insert lamp body.

Preferably, the first connecting module is a Bluetooth or a WiFi module.

Preferably, the second connecting module is a 2.4G wireless connecting module, and the third connecting module is a 2.4G wireless connecting module.

According to the primary advantage of the present invention, the smart control module transmits a control signal to the main machine module, and the main machine module controls the working condition of the ground insert lamp modules according to the signal commands transmitted by the smart control module, so as to achieve a smart control and manipulation of the ground insert lamp.

Further benefits and advantages of the present invention will become apparent after a careful reading of the detailed description with appropriate reference to the accompanying drawings.

BRIEF DESCRIPTION OF THE SEVERAL VIEWS OF THE DRAWING(S)

DETAILED DESCRIPTION OF THE INVENTION

Figure 1:
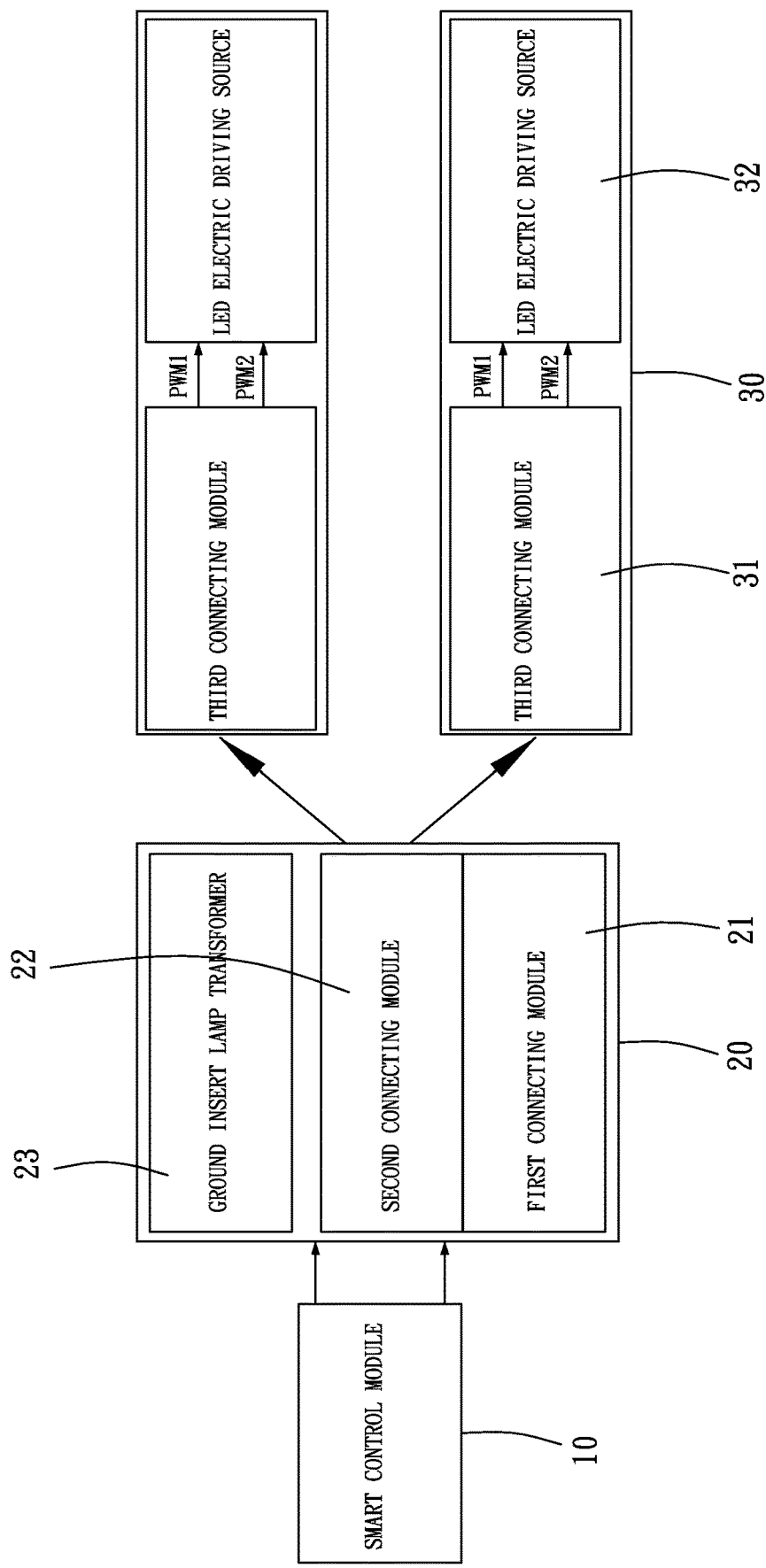
FIG. 1 is a block diagram of a ground insert lamp in accordance with the preferred embodiment of the present invention.
Figure 2:
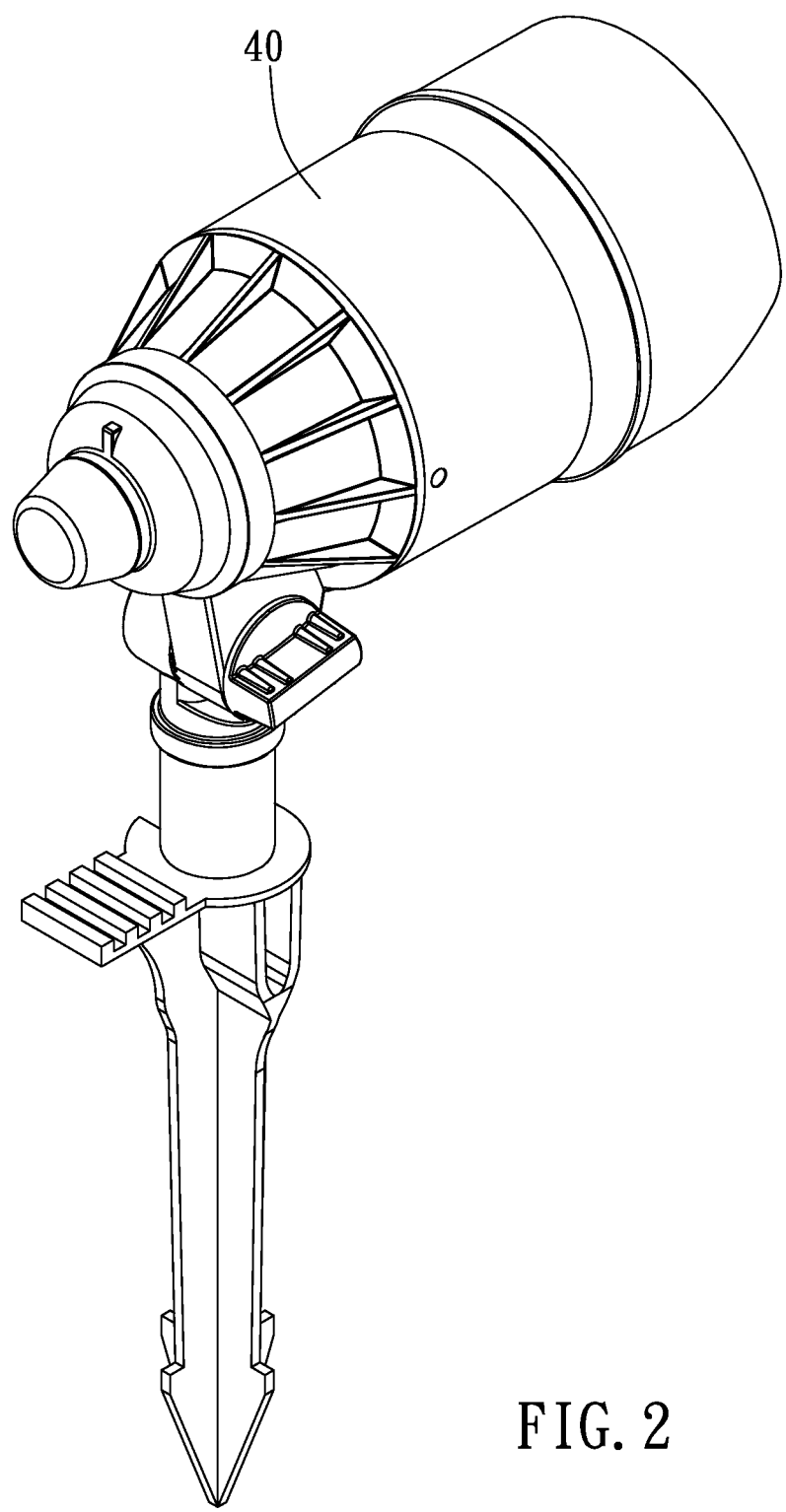
FIG. 2 is a perspective view of the ground insert lamp in accordance with the preferred embodiment of the present invention.
Figure 3:
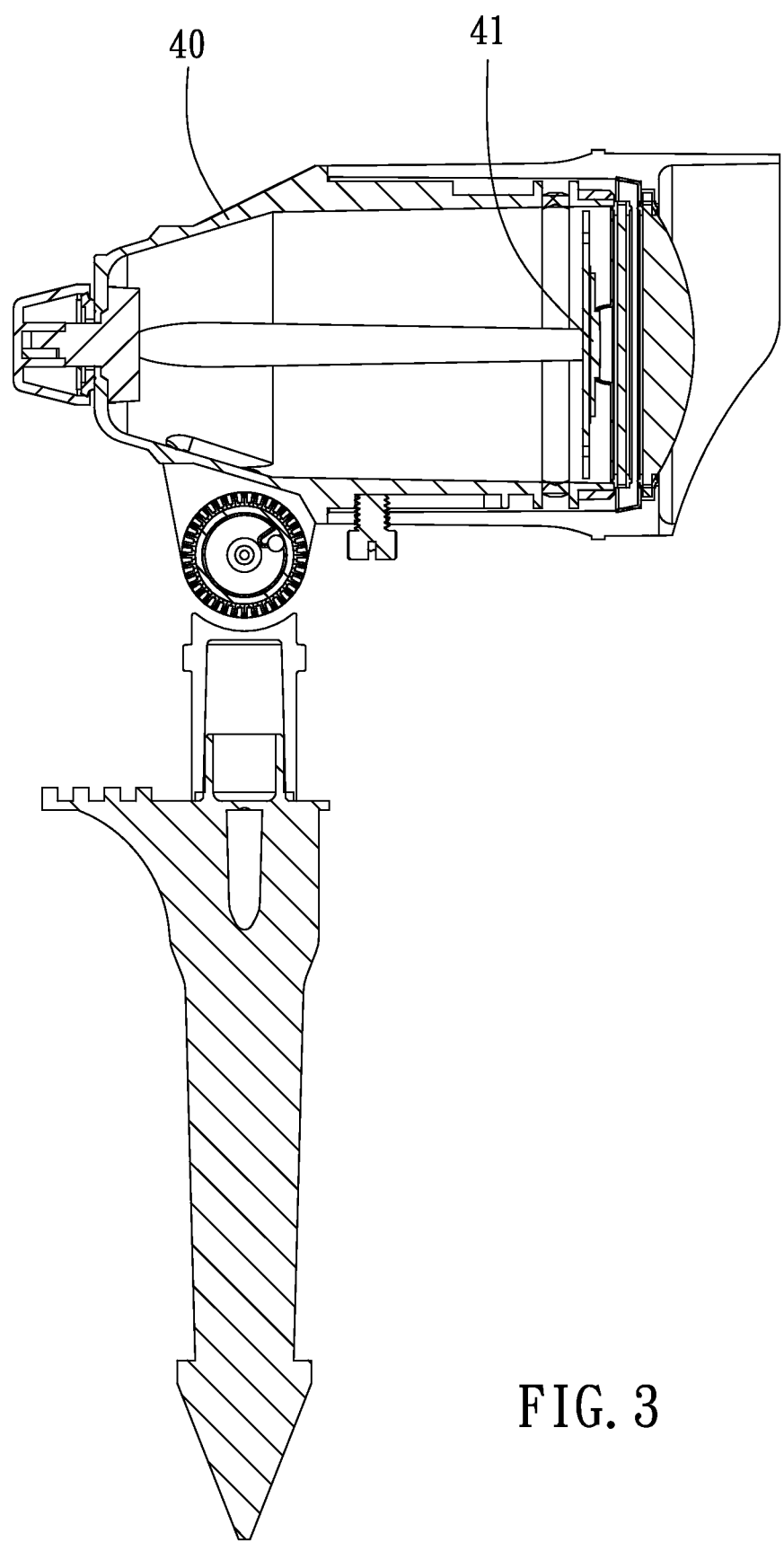
FIG. 3 is a cross-sectional assembly view of the ground insert lamp in accordance with the preferred embodiment of the present invention.

Referring to FIGS. 1-3, a ground insert lamp in accordance with the preferred embodiment of the present invention comprises a smart control module 10, a main machine module 20, and a plurality of ground insert lamp modules 30.

The smart control module 10 cooperates with the main machine module 20. The smart control module 10 is signal connected to the main machine module 20. Thus, the smart control module 10 transmits a control signal to the main machine module 20.

The main machine module 20 is connected with the ground insert lamp modules 30. The main machine module 20 includes a ground insert lamp transformer 23, a first connecting module 21, and a second connecting module 22. The ground insert lamp transformer 23 converts an input voltage into a predetermined voltage which satisfies the voltage requirement of the ground insert lamp modules 30. The first connecting module 21 is signal connected to the smart control module 10. The second connecting module 22 is signal connected to the ground insert lamp modules 30. Thus, the main machine module 20 controls the ground insert lamp modules 30 to work according to the signal commands transmitted by the smart control module 10.

Each of the ground insert lamp modules 30 includes a third connecting module 31, an LED (light emitting diode) electric driving source 32, and a ground insert lamp body 40. The third connecting module 31 cooperates with the second connecting module 22 and is connected with the second connecting module 22. The ground insert lamp body 40 is connected with the LED electric driving source 32. The ground insert lamp body 40 has an interior provided with a plurality of light emitting members 41 with multiple color temperatures. Each of the ground insert lamp modules 30 controls the LED electric driving source 32 to regulate brightness and color temperature of the light emitting members 41 of the ground insert lamp body 40.

In the preferred embodiment of the present invention, the first connecting module 21 is a Bluetooth or a WiFi (wireless fidelity) module.

In the preferred embodiment of the present invention, the second connecting module 22 is a 2.4G wireless connecting module, and the third connecting module 31 is a 2.4G wireless connecting module.

In the preferred embodiment of the present invention, the smart control module 10 includes a cell phone, a tablet computer or other smart electronic equipment.

In the preferred embodiment of the present invention, the third connecting module 31 is connected with the LED electric driving source 32. Preferably, the third connecting module 31 of each of the ground insert lamp modules 30 sends two PWM (pulse width modulation) signals (including PWM1 and PWM2) to the LED electric driving source 32 to control the LED electric driving source 32 so as to regulate brightness and color temperature of the light emitting members 41 of the ground insert lamp body 40.

Accordingly, the smart control module 10 transmits a control signal to the main machine module 20, and the main machine module 20 controls the working condition of the ground insert lamp modules 30 according to the signal commands transmitted by the smart control module 10, so as to achieve a smart control and manipulation of the ground insert lamp.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the scope of the invention.

The invention claimed is:

1. A ground insert lamp comprising:
a smart control module, a main machine module, and a plurality of ground insert lamp modules;
wherein:
the smart control module cooperates with the main machine module;
the smart control module is signal connected to the main machine module;
the main machine module includes a ground insert lamp transformer, a first connecting module, and a second connecting module;
the first connecting module is signal connected to the smart control module;
the second connecting module is signal connected to the ground insert lamp modules;
each of the ground insert lamp modules includes a third connecting module, an LED electric driving source, and a ground insert lamp body;
the third connecting module cooperates with the second connecting module and is connected with the second connecting module;
the ground insert lamp body is connected with the LED electric driving source;
the ground insert lamp body has an interior provided with a plurality of light emitting members with multiple color temperatures; and
each of the ground insert lamp modules controls the LED electric driving source to regulate brightness and color temperature of the light emitting members of the ground insert lamp body.

2. The ground insert lamp as claimed in claim 1, wherein the first connecting module is a Bluetooth or a WiFi module.

3. The ground insert lamp as claimed in claim 1, wherein the second connecting module is a 2.4G wireless connecting module, and the third connecting module is a 2.4G wireless connecting module.

* * * * *